US009607088B2

(12) United States Patent
Chun

(10) Patent No.: US 9,607,088 B2
(45) Date of Patent: Mar. 28, 2017

(54) METHOD AND APPARATUS FOR DETECTING MULTIMEDIA CONTENT CHANGE, AND RESOURCE PROPAGATION SYSTEM

(71) Applicant: Shenzhen Development Promotion Centre For Enterprises, Shenzhen (CN)

(72) Inventor: Jimmy Chun, Shenzhen (CN)

(73) Assignee: SHENZHEN DEVELOPMENT PROMOTION CENTRE FOR ENTERPRISES, Shenzhen, Guangdong (CN)

( * ) Notice: Subject to any disclaimer, the term of this patent is extended or adjusted under 35 U.S.C. 154(b) by 266 days.

(21) Appl. No.: 14/452,070

(22) Filed: Aug. 5, 2014

(65) Prior Publication Data
US 2015/0304188 A1 Oct. 22, 2015

(30) Foreign Application Priority Data

Apr. 22, 2014 (CN) .......................... 2014 1 0163350

(51) Int. Cl.
*G06F 17/30* (2006.01)
*H04L 29/06* (2006.01)
*H04L 29/12* (2006.01)

(52) U.S. Cl.
CPC .... *G06F 17/30864* (2013.01); *H04L 61/1582* (2013.01); *H04L 63/1416* (2013.01)

(58) Field of Classification Search
CPC ...................... G06F 17/30864–17/3089; G06F 21/56–21/577; H04L 61/1582; H04L 63/101–63/1461; H04L 63/123–63/168; G06Q 10/107
See application file for complete search history.

(56) References Cited

U.S. PATENT DOCUMENTS

| 6,721,721 B1 * | 4/2004 | Bates ................. G06F 21/562 |
| 8,176,079 B1 * | 5/2012 | Spertus ............ G06F 17/30867 707/785 |
| 8,943,197 B1 * | 1/2015 | Taylor .............. G06F 17/30861 709/224 |

(Continued)

*Primary Examiner* — Wing F Chan
*Assistant Examiner* — Raji Krishnan
(74) *Attorney, Agent, or Firm* — Leason Ellis LLP

(57) ABSTRACT

A method and apparatus for detecting a multimedia content change, and a resource propagation system. The method comprises: when importing a resource address of multimedia content, acquiring original feature information of the multimedia content; receiving first feature information of the multimedia content from a client; determining, according to the first feature information and corresponding original feature information of the multimedia content, whether the resource address of the multimedia content is abnormal; and detecting whether multimedia content at an abnormal resource address is changed. It is firstly determined whether a resource address corresponding to multimedia content is abnormal, and if the resource address is abnormal, then it is determined whether the multimedia content corresponding to the resource address is changed, thereby preventing repeated checking of a large number of normal resource addresses, improving the detection efficiency, and reducing the detection cost.

30 Claims, 4 Drawing Sheets

(56) References Cited

U.S. PATENT DOCUMENTS

| | | | |
|---|---|---|---|
| 2009/0077002 A1* | 3/2009 | Clark | G06Q 10/107 |
| | | | 706/59 |
| 2009/0089337 A1* | 4/2009 | Perlin | G06F 17/30144 |
| 2009/0198670 A1* | 8/2009 | Shiffer | G06F 17/30675 |
| 2009/0287684 A1* | 11/2009 | Bennett | G06F 17/3089 |
| 2009/0316894 A1* | 12/2009 | Li | G06F 21/10 |
| | | | 380/210 |
| 2013/0291082 A1* | 10/2013 | Giladi | H04L 63/123 |
| | | | 726/7 |
| 2014/0324741 A1* | 10/2014 | Stewart | G06N 99/005 |
| | | | 706/12 |
| 2015/0007312 A1* | 1/2015 | Pidathala | H04L 63/145 |
| | | | 726/22 |
| 2015/0012616 A1* | 1/2015 | Pearl | H04L 67/1095 |
| | | | 709/219 |
| 2015/0039598 A1* | 2/2015 | Hardy | G06F 17/30864 |
| | | | 707/723 |

\* cited by examiner

METHOD AND APPARATUS FOR DETECTING MULTIMEDIA CONTENT CHANGE, AND RESOURCE PROPAGATION SYSTEM

This application is based on Chinese Patent Application No. 201410163350.X filed with the Chinese Patent Office on Apr. 22, 2014, the entire content of which is hereby incorporated by reference.

FIELD OF THE INVENTION

The present invention relates to the Internet field, and particularly, to a method and apparatus for detecting a multimedia content change, and a resource propagation system.

BACKGROUND OF THE INVENTION

A uniform resource locator (URL) is a brief expression of a location where a resource can be acquired and an access method thereof, and is a resource address of a standard resource on the Internet. Each resource on the Internet is assigned a unique resource address, which comprises information specifying the location of the resource and how a related application, for example, a browser processes the resource, and has been formulated in the Internet standards RFC 1738 by the World Wide Web Consortium.

At present, in content propagated over the Internet, for enhancement of the diversity of the content and for support in importing external multimedia content, the external multimedia content is generally stored in a dedicated multimedia content server, and resource addresses of the multimedia content are generally stored in a resource propagation system. With respect to evaluation of the multimedia content, evaluation indicators need to be directed to the resource address of the multimedia content. Accordingly, it is desired that a method for effectively detecting whether a multimedia content directed by a resource address is changed is provided.

With a conventional detection method, a resource propagation system constantly traverses resource addresses of multimedia content to determine whether the multimedia content directed by the resource addresses is changed. However, in this case, it is inevitable that the resource propagation system repeatedly checks a large number of normal resource addresses, thereby causing a low efficiency of detecting a multimedia content change and increasing the detection cost.

SUMMARY OF THE INVENTION

Embodiments of the present invention provide a method for detecting a multimedia content change, to solve the problem, in the related art, that the efficiency of detecting a multimedia content change is low and the cost thereof is high.

An embodiment of the present invention provides a method for detecting a multimedia content change. The method comprises:

when importing a resource address of multimedia content, acquiring original feature information of multimedia content;

receiving first feature information of the multimedia content from a client;

determining, according to the first feature information and corresponding original feature information of the multimedia content, whether the resource address of the multimedia content is abnormal; and detecting whether multimedia content corresponding to an abnormal resource address is changed.

An embodiment of the present invention provides an apparatus for detecting a multimedia content change. The apparatus comprises:

an original feature information acquiring unit, configured to: when importing a resource address of multimedia content, acquire original feature information of the multimedia content;

a first feature information acquiring unit, configured to receive first feature information of the multimedia content from a client;

an abnormal resource address detecting unit, configured to determine, according to the first feature information and the original feature information of the multimedia content, whether the resource address of the multimedia content is abnormal; and a multimedia content change detecting unit, configured to detect whether multimedia content corresponding to an abnormal resource address is changed.

An embodiment of the present invention provides a resource propagation system. The system comprises an apparatus for detecting a multimedia content change.

The apparatus for detecting a multimedia content change comprises:

an original feature information acquiring unit, configured to: when importing a resource address of multimedia content, acquire original feature information of the multimedia content;

a first feature information acquiring unit, configured to receive first feature information of the multimedia content from a client;

an abnormal resource address detecting unit, configured to determine, according to the first feature information and the original feature information of the multimedia content, whether the resource address of the multimedia content is abnormal; and a multimedia content change detecting unit, configured to detect whether multimedia content corresponding to an abnormal resource address is changed.

According to the embodiments of the present invention, it is firstly determined whether a resource address corresponding to multimedia content is abnormal, and if the resource address is abnormal, then it is determined whether the multimedia content corresponding to the resource address is changed, thereby preventing repeated checking of a large number of normal resource addresses, improving the detection efficiency, and reducing the detection cost.

BRIEF DESCRIPTION OF THE DRAWINGS

These and other features and advantages of the present invention will become more readily appreciated when considered in connection with the following detailed description and appended drawings, wherein like designations denote like elements in the various views, and wherein.

DETAILED DESCRIPTION OF THE INVENTION

To make the objectives, technical solutions, and advantages of the present invention clearer, the present invention is further described in detail in combination with specific embodiments and attached drawings. It should be understood that the embodiments described herein are only exemplary ones for illustrating the present invention, and are not intended to limit the present invention.

In the embodiments of the present invention, it is first determined whether a resource address corresponding to multimedia content is abnormal, and then it is determined whether the multimedia content corresponding to an abnormal resource address is changed.

Figure 1:
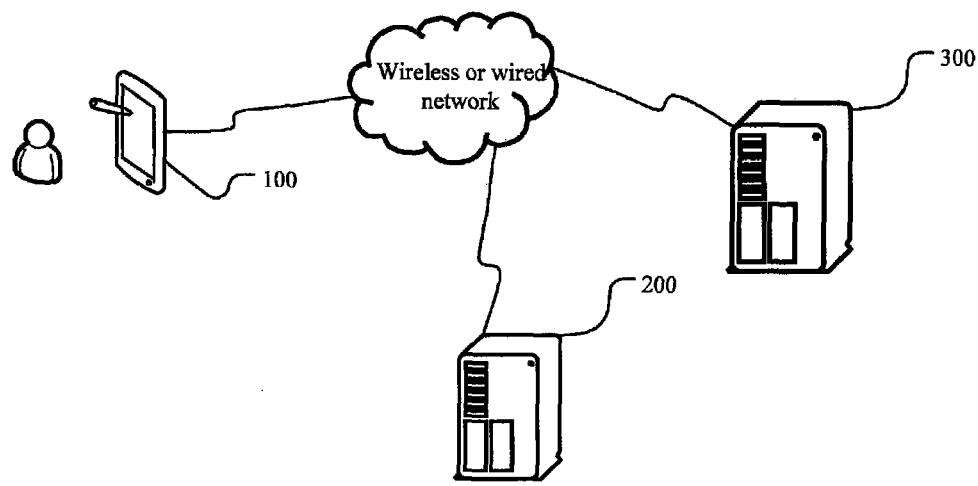
FIG. 1 is a schematic structural view of an implementation environment of a method for detecting a multimedia content change according to an embodiment of the present invention.

FIG. 1 illustrates an implementation environment of a method for detecting a multimedia content change according to an embodiment of the present invention. The implementation environment comprises a plurality of terminal devices 100, one or a plurality of resource propagation servers 200, one or a plurality of multimedia content servers 300.

The terminal device 100, the resource propagation servers 200, and the multimedia content servers 300 are communicated with each other via a wired network or a wireless network.

The plurality of resource propagation servers 200 are communicatively connected to each other via a wired network or a wireless network.

The plurality of multimedia content servers 300 are communicatively connected to each other via a wired network or a wireless network.

The terminal device 100 may be a personal computer, a smart television, a smart phone, a tablet computer, an electronic book reader, a Moving Picture Experts Group Audio Layer III (MP3) player, a Moving Picture Experts Group Audio Layer IV (MP4) player, a TV, a laptop computer, a desktop computer, and the like.

The multimedia content server 300 stores multimedia content data for the terminal device 100 to download or play, thereby providing multimedia content for a user. The multimedia content may be audios, videos, texts, pictures, or the like.

The resource propagation server 200 stores resource addresses of the multimedia content stored on the multimedia content server 300, and may communicate with the terminal device 100 via a wired network or a wireless network.

The user acquires the resource address of the multimedia content from the resource propagation server 200 via the terminal device 100, acquires corresponding multimedia content from the multimedia content server 300 via the resource address, and then browses, downloads or plays the multimedia content.

Figure 2:
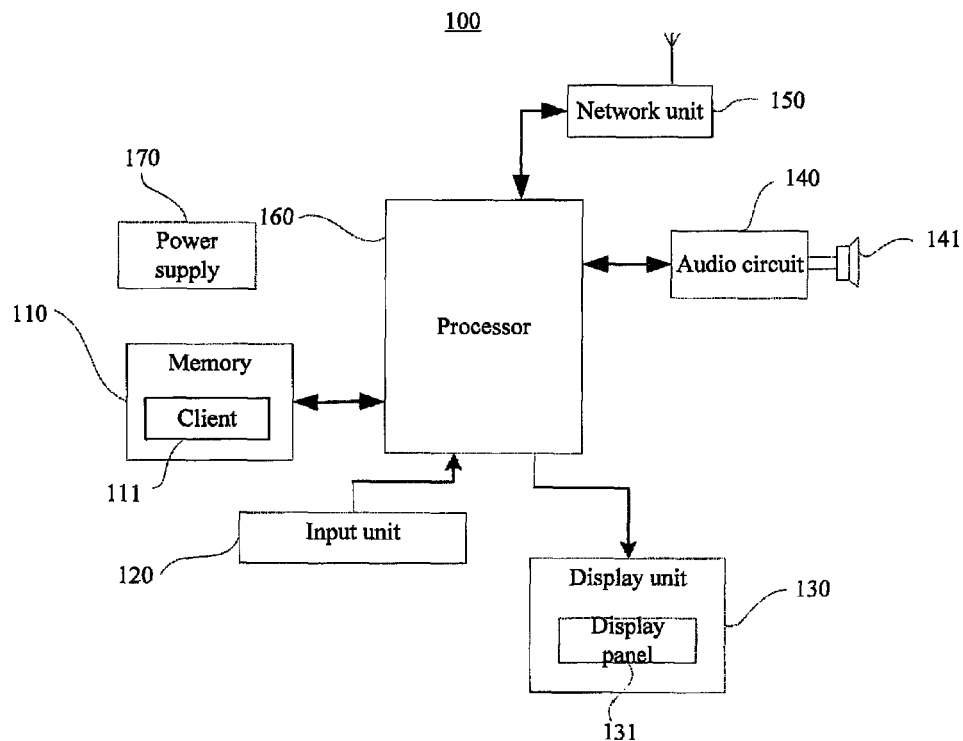
FIG. 2 is a flowchart of a method for detecting a multimedia content change according to an embodiment of the present invention.

FIG. 2 illustrates a schematic structural view of a terminal device according to an embodiment of the present invention.

The terminal device 100 is configured to implement the method for detecting a multimedia content change according to an embodiment of the present invention.

The terminal device 100 may comprise one or a plurality of the following components: a processor configured to run computer program instructions to implement various processes and methods; a random access memory (RAM) and a read-only memory (ROM) configured to store information and program instructions; a memory, an input/output (I/O) device, and an interface configured to store data and information and the like.

The terminal device 100 may comprise component such as one or a plurality of memories 110 serving as computer-readable storage media, an input unit 120, a display unit 130, an audio unit 140, a network communication unit 150, one or a plurality of processors 160, and a power supply 170. A person skilled in the art may understand that the structure of the terminal device as illustrated in FIG. 2 does not construe a limitation on the terminal device 100. The terminal device may comprise more or fewer components over those illustrated in FIG. 2, or combinations of some components, or employ different component deployments.

The memory 110 may be configured to store a software program and/or a module; the processor 160 executes various function applications and data processing by running the software program and/or module stored in the memory 110.

The memory 110 may comprise a program storage area and a data storage area.

The program storage area may store an operating system, and at least one function-specific application, for example, an application for acquiring the resource address of multimedia content from the resource propagation server 200, and an application for acquiring corresponding multimedia content from the multimedia content server 300 via the resource address, and browsing, downloading or playing the multimedia content or the like.

The data storage area may store data created according to use of the terminal device 100, for example, multimedia content acquired from the multimedia content server 300.

The memory 110 may comprise a high speed random access memory, or include a non-volatile memory, for example, at least one disk storage device, a flash memory device, or another volatile solid storage device. Accordingly, the memory 110 may further comprise a memory controller (not illustrated in FIG. 2), for providing access to the memory 110 for the processor 160 and an input unit 120.

The terminal device 100 further comprises at least one program. The at least one program is stored in the memory 110 and is configured to be performed by at least one processor 160. The at least one program comprises instructions for performing the method for detecting a multimedia content change according to the embodiments of the present invention.

In the embodiments of the present invention, the memory 110 comprises a client 111. The client 111 may be provided by a content service provider, for example, a browser client, a forum client, an email client, a microblog client or an entertainment client, an online audio player client, an online video player client, or the like.

The client 111 may be a client matching the resource propagation server 200, or may be a third-party client. When the client 111 is a third-party client, the resource propagation server 200 is an open interface of the third-party client, and the third-party client is capable of implementing communication with the resource propagation server 200 by calling the interface.

The inputting unit 120 may be configured to receive data and information input by a user, and generate signal input of a keyboard, a mouse, a touch screen, an operation rod, an optical or a track ball related to user settings and function control, and comprise but is not limited to one or a plurality of a physical keyboard, a function key, a track ball, a mouse, a touch screen, an operation rod, and the like.

The display unit 130 may be configured to output various visible information to the user and display information input by the user or information provided to the user, and various graphical user interfaces of the terminal device 100. These graphical user interfaces may be formed by graphics, texts, icons, and videos or any combination thereof.

The display unit 130 may comprise a display panel 131. Alternatively, the display panel 131 may be configured by using a liquid crystal display (LCD), an organic light-emitting diode (OLED) or the like.

The audio circuit 140 and a loudspeaker 141 are capable of providing an audio interface between the user and the terminal device 100. The audio circuit 140 may transmit electrical signals converted from received audio data to the loudspeaker 141, and the loudspeaker 141 converts the electrical signals into audio signals and outputs the audio signals. The audio circuit 140 may further comprise an earphone plug for providing communication of an external earphone with the terminal device 100.

The network communication unit 150 may provide a wired connection or a wireless connection for the terminal device 100 to access the network, such that the user is capable of receiving and sending emails, browsing webpages, and accessing streaming media, including communication with the resource propagation server 200 or the multimedia content server 300.

The processor 160 runs or executes a software program and/or module stored in the memory 110, calls data stored in the memory 110, and implements various functions of the terminal device 100 and processes data. Optionally, the processor 160 may comprise one or a plurality of processing cores.

The terminal device 100 further comprises a power supply 170 (for example, a battery) for supplying power to various components. Preferably, the power supply may be logically connected to the processor 160 via a power supply management system, such that charging, discharging, and power consumption are managed via the power supply management system. The power supply 170 may further comprise at least one DC or AC power supply, a recyclable charging system, a power fault detection circuit, a power converter or inverter, a power state indicator, and the like.

Upon receiving a request for playing multimedia content corresponding to a resource address, the terminal device 100 acquires and sends first feature information of the multimedia content to the resource propagation server 200; and the resource propagation server 200 compares the first feature information of the multimedia content with extracted corresponding original feature information, and determines whether the multimedia content is changed. In this way, the problem in the related art, that it needs to be determined, by repeatedly traversing a resource address of the multimedia content, whether multimedia content directed by the resource address is changed, and that the efficiency of detecting a multimedia content change is low and the cost thereof is high because a large number of normal resource addresses need to be repeatedly detected.

Compared with the method for detecting a multimedia content change in the related art, according to the embodiments of the present invention, it is firstly determined determine whether a resource address corresponding to multimedia content is abnormal, and if the resource address is abnormal, then it is determined determine whether the multimedia content corresponding to the resource address is changed, thereby preventing repeated checking of a large number of normal resource addresses, improving the detection efficiency, and reducing the detection cost.

In the embodiments of the present invention, the multimedia content is stored in the multimedia content server, and may be audios, videos, or images.

As an embodiment of the present invention, it may be determined, according to the first feature information and corresponding original feature information of the multimedia content, whether the resource address of the multimedia content is abnormal.

In the embodiments of the present invention, the original feature information of the multimedia content may be a play duration, a file size, and a checksum of the multimedia content. In the field of data processing and data communication, the checksum of a file refers to a sum of a group of data items for a check purpose. These data items may be digits or other character strings taken as digits during calculation of the checksum. As an embodiment of the present invention, the checksum of a file of the multimedia content may be message-digest algorithm 5 (MD5), secure Hash algorithm 1 (SHA1), cyclic redundancy check 32 (CRC32) of the file.

It should be noted that when the multimedia content is an image, the original feature information does not comprise the play duration.

In the embodiments of the present invention, the first feature information of the multimedia content may be a play duration and/or a file size of the multimedia content.

It should be noted that the more the information that is comprised in the first feature information, the more reliable the detection result. However, due to factors such as technical restrictions and data acquisition cost, in the embodiments of the present invention, the client merely sends the play duration and/or the file size of the multimedia content to the resource propagation server. To enhance the detection reliability, the original feature information acquired by the resource propagation server may comprise the play duration, the file size, and the file checksum of the multimedia content.

In the embodiments of the present invention, the client may be a client matching the resource propagation server, or may be a third-party client. When the client is a third-party client, the resource propagation server is an open interface of the third-party client, and communication between the resource propagation server and the third-party client may be implemented by calling the interface.

When the client merely sends the play duration of the multimedia content to the resource propagation server, upon determining that the resource address of the multimedia content is abnormal, the resource propagation server compares play durations of multimedia content sent by different clients with play durations of corresponding original feature information of the multimedia content.

Likewise, when the client merely sends the file size of the multimedia content to the resource propagation server, upon determining that the resource address of the multimedia content is abnormal, the resource propagation server compares file sizes of multimedia content sent by different clients with file sizes of corresponding original feature information of the multimedia content.

When the client sends the play duration and the file size of the multimedia content to the resource propagation server, upon determining that the resource address of the multimedia content is abnormal, the resource propagation server compares both play durations and file sizes of multimedia content sent by different clients with play durations and file sizes of corresponding original feature information of the multimedia content.

The above three manners may all be employed to determine whether the resource address of the multimedia content is abnormal. The specific manner to be employed is not limited in the embodiments of the present invention.

Figure 3:
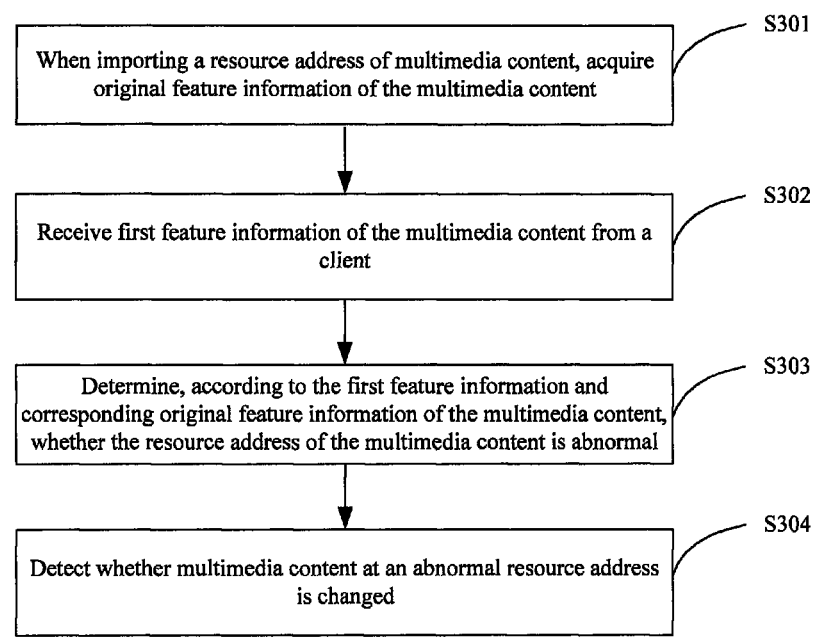
FIG. 3 is a schematic structural view of an apparatus for detecting a multimedia content change according to an embodiment of the present invention.

FIG. 3 is a flowchart of a method for detecting a multimedia content change according to an embodiment of the present invention.

In step S301, during importing of a resource address of multimedia content, original feature information of the multimedia content is acquired.

As an embodiment of the present invention, during importing of a resource address of multimedia content, corresponding multimedia content is downloaded via the resource address of the multimedia content, and original feature information of the multimedia content is extracted.

In step S302, first feature information of the multimedia content is received from a client.

In the embodiments of the present invention, the client may be a client matching the resource propagation server, or may be a third-party client. When the client is a third-party client, the resource propagation server is an open interface of the third-party client, and communication between the resource propagation server and the third-party client may be implemented by calling the interface.

In the embodiments of the present invention, upon receiving a request for playing multimedia content corresponding to a resource address, the client acquires first feature information of the multimedia content, and sends the acquired first feature information to the resource propagation server.

In step S303, it is determined, according to the first feature information of the multimedia content and the corresponding original feature information, whether the resource address of the multimedia content is abnormal. If it is determined that the resource address is abnormal, step S304 is performed.

As an embodiment of the present invention, within a predetermined time period, the number n of play times where first feature information of the multimedia content sent by different clients is inconsistent with corresponding original feature information of the multimedia content in terms of play duration and/or file size, and the total number N of play times are counted; a non-consistency ratio n/N is calculated; and when n/N exceeds a predetermined threshold p, it is determined that the resource address of the multimedia content is abnormal.

where n and N are positive integers, and 0<p<1.

The predetermined time period may be 1 hour, 1 day, or half an hour, and may be defined according to practical requirements, which is not limited in the embodiments of the present invention.

In the embodiments of the present invention, the predetermined threshold is a preferred value estimated by the resource propagation server according to the acquired multimedia content. Subject to network instability factors, the predetermined threshold may be adjusted. Specifically, the predetermined threshold is adjusted with reference to an running effect of the multimedia content on the resource propagation server, i.e., adjusted after determining how much multimedia content in an abnormal resource list is changed.

In step S304, it is detected whether multimedia content corresponding to an abnormal resource address is changed.

As an embodiment of the present invention, with respect to an abnormal resource address, it is compared whether first feature information of multimedia content sent by different clients is the same, and if the first feature information is the same and is different from corresponding original feature information of the multimedia content in terms of play duration and/or file size, it is determined that the multimedia content is changed.

If the first feature information sent by some of the clients is different, second feature information of the multimedia content corresponding to the resource address is acquired; and if the acquired second feature information is inconsistent with the corresponding original feature information, it is determined that the multimedia content is changed.

In the embodiments of the present invention, the second feature information of the multimedia content may be a play duration, a file size, and a checksum of the multimedia content after the propagation.

According to the embodiments of the present invention, during importing of a resource address of multimedia content, original feature information of the multimedia content is acquired; first feature information of the multimedia content from a client is received; according to the first feature information and corresponding original feature information of the multimedia content, it is determined whether the resource address of the multimedia content is abnormal; and it is determined whether multimedia content at an abnormal resource address is changed, thereby preventing repeated checking of a large number of normal resource addresses, improving the detection efficiency, and reducing the detection cost.

In the embodiments of the present invention, the multimedia content may be audios, videos, or images.

Using a scenario where multimedia content is a video, the process of detecting whether the multimedia content is changed is further described as follows:

1. The resource propagation server 200 acquires the resource address of a video file from the multimedia content server 300.

2. The resource propagation server 200 downloads the video file corresponding to the resource address, extracts original feature information of the video file, and stores the resource address and the original feature information of the video file.

In the embodiments of the present invention, the resource address of the video file is imported, and in this case, original feature information of the multimedia content corresponding to the resource address is extracted. It may be understood that before the video file is not propagated on the resource propagation server 200, the original feature information of the video file is acquired.

3. The client receives a request for playing the video file corresponding to the resource address.

In the embodiments of the present invention, when a user triggers an instruction for playing the video file corresponding to the resource address, the client receives the request for playing the video file.

4. The client acquires first feature information of the video file.

5. The client sends the acquired first feature information and the resource address of the video file to the resource propagation server 200.

6. The resource propagation server 200 stores the first feature information and the resource address of the video file sent by the client.

7. When the time reaches predetermined time, the resource propagation server 200 counts the number n of play times where first feature information of the multimedia content sent by different clients is different from corresponding original feature information of the multimedia content in terms of play duration and/or file size, and the total number N of play times.

8. The resource propagation server 200 calculates a non-consistency ratio n/N, and determines whether the ratio exceeds a predetermined threshold. If the ratio exceeds the predetermined threshold, perform step 9.

9. The resource propagation server 200 stores an abnormal resource address into an abnormal resource address list.

10. The resource propagation server 200 traverses resource addresses in the abnormal resource address list, and with respect to the abnormal resource addresses, determines whether first feature information of video files corresponding to the resource address sent by different clients is the same. If the first feature information is the same and is different from original feature information corresponding to the resource addresses, it is determined that the video files corresponding to the resource addresses are changed; and otherwise, step 11 is performed.

It should be noted that the term "same" herein may refer to the case where first feature information sent by most of the clients is the same. To be specific, if a ratio n/M of the number m of play times where the first feature information of the video files sent by different clients to the total number N of play times exceeds a predetermined threshold q, it is considered that the first feature information of the video files is the same, where m is a positive integer, and 0<q<1.

11. The resource propagation server 200 downloads the video files corresponding to the abnormal resource addresses again, extracts second feature information of the video files, and stores the resource addresses and the original feature information of the video files.

In the embodiments of the present invention, the second feature information of the video files may be a play duration, a file size, and a checksum of the video files after the video files are played.

12. The resource propagation server 200 determines whether the extracted second feature information of the video files is consistent with the original feature information of the video files. If inconsistent, it is determined that the video files corresponding to the resource address are changed; and otherwise, step 13 is performed.

In the embodiments of the present invention, if the second feature information and the corresponding original feature information of a video file are the same in terms of play duration, file size, and file checksum, it is considered that the second feature information of the video file is consistent with the feature information of the video file. To be specific, if the play duration of the second feature information is the same as that of the original feature information, the file size of the second feature information is the same as that of the original feature information, and the file checksum of the second feature information is the same as that of the original feature information, then it is considered that the second feature information of the video file is consistent with the original feature information of the video file.

13. The resource propagation server 200 determines that the video file is not stable, lowers a comprehensive score of the video file, and adds the video file into a non-recommendation list.

As an embodiment of the present invention, the term "instability" indicates that video-on-demand services are not stable.

In the embodiments of the present invention, the comprehensive score serves as a basis for sequencing in a multimedia content list. The non-recommendation list is used to filter the multimedia content during recommendation of specific multimedia content.

With the method for detecting a multimedia content change according to the embodiments of the present invention, it is detected whether a resource address corresponding to a video file is abnormal, an abnormal resource address is stored in an abnormal resource address list, the abnormal resource addresses in the abnormal resource address list are traversed, and it is determined whether a video file corresponding to the abnormal address is changed. In this way, repeated checking of a large number of normal resource addresses is prevented, the detection efficiency is improved, and the detection cost is reduced.

Figure 4:
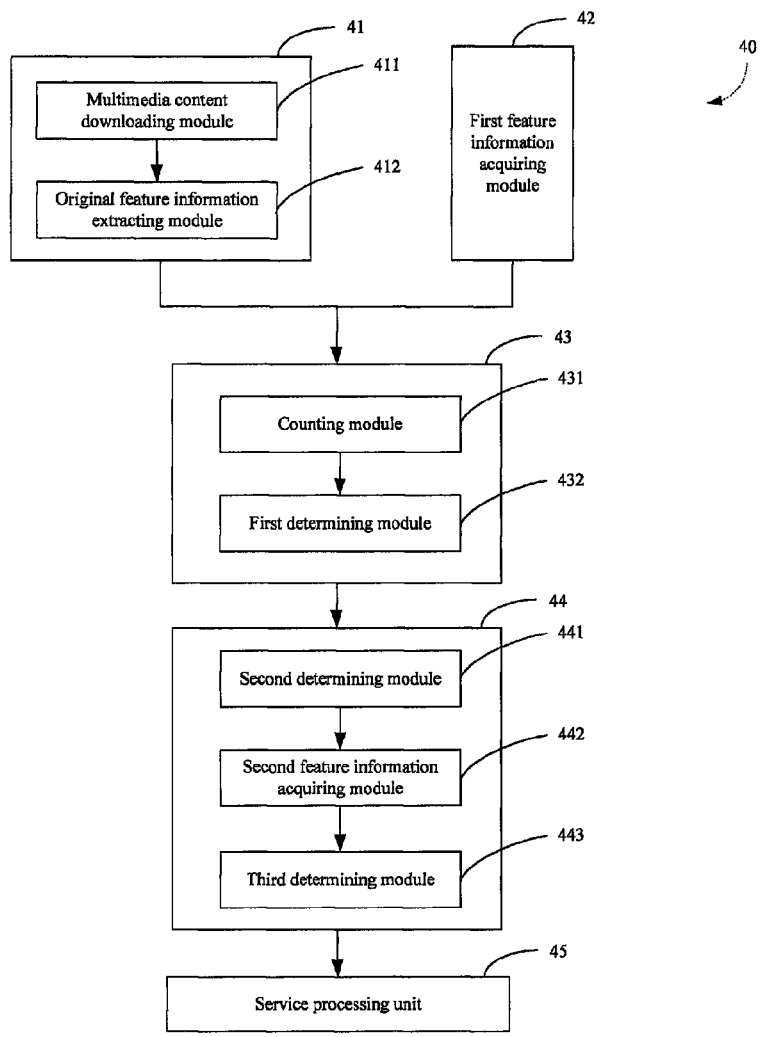
FIG. 4 is a schematic structural view of a terminal device according to an embodiment of the present invention.

FIG. 4 illustrates a structure of an apparatus 40 for detecting a multimedia content change according to an embodiment of the present invention. For ease of description, parts relevant to the embodiments of the present invention are only illustrated.

The apparatus 40 for detecting a multimedia content change may be integrated or applied in a resource propagation system. The resource propagation system may be an instant messaging tool, or such a social networking website as microblog and Weibo, a forum, a news releasing system, a multimedia releasing system for video or music releasing, various content releasing APPs, an application system, and the like.

The resource propagation system is configured on one or a plurality of resource propagation servers 200, and propagates the resource address of the multimedia content to the Internet.

During the process of detecting a multimedia content change by the resource propagation server, the apparatus 40 for detecting a multimedia content change firstly determines whether a resource address corresponding to multimedia content is abnormal, and if the resource address is abnormal, then determines whether the multimedia content corresponding to an abnormal resource address is changed, thereby preventing repeated checking of a large number of normal resource addresses, improving the detection efficiency, and reducing the detection cost.

In the embodiments of the present invention, the apparatus for detecting a multimedia content change comprises an original feature information acquiring unit 41, a first feature information acquiring unit 42, an abnormal resource address detecting unit 43, and a multimedia content change detecting unit 44.

The original feature information acquiring unit 41 is configured to: when importing a resource address of multimedia content, acquire original feature information of the multimedia content.

As an embodiment of the present invention, the original feature information acquiring unit 41 comprises a multimedia content downloading module 411 and an original feature information extracting module 412.

The multimedia content downloading module 411 is configured to: when importing the resource address of the multimedia content, download the multimedia content via the resource address of the multimedia content.

The original feature information extracting module 412 is configured to extract the original feature information of the multimedia content downloaded by the multimedia content downloading module 411.

In the embodiments of the present invention, the original feature information of the multimedia content may be a play duration, a file size, and a checksum of the multimedia content.

The first feature information acquiring unit 42 is configured to receive first feature information of the multimedia content from a client.

In the embodiments of the present invention, the first feature information is a play duration and/or a file size when the multimedia content is played on different clients.

The abnormal resource address detecting unit 43 is configured to: according to the first feature information received by the first feature information acquiring unit 42, and the corresponding original feature information acquired by the original feature information acquiring unit 41 determine whether the resource address of the multimedia content is abnormal.

As an embodiment of the present invention, the abnormal resource address detecting unit 43 comprises a counting module 441 and a first determining module 442.

The counting module 441 is configured to: within a predetermined time period, count the number n of play times where first feature information of the multimedia content is inconsistent with corresponding original feature information of the multimedia content in terms of play duration and/or file size, and the total number N of play times.

The first determining module 442 is configured to: when n/N exceeds a predetermined threshold p, determine that the resource address of the multimedia content is abnormal.

where n and N are positive integers, and 0<p<1.

The multimedia content change detecting unit 44 is configured to detect whether the multimedia content corresponding to the abnormal resource address determined by the abnormal resource address detecting unit 43 is changed.

As an embodiment of the present invention, the multimedia content change detecting unit 44 comprises a second determining module 441, a second feature information acquiring module 442, and a third determining module 443.

The second determining unit 441 is configured to compare whether first feature information of multimedia content sent by different clients is the same, and if the first feature information is the same and is different from corresponding original feature information of the multimedia content in terms of play duration and/or file size, determine that the multimedia content is changed.

The second feature information acquiring module 442 is configured to: if the second determining module 441 determines that the first feature information sent by some of the clients is different, acquire second feature information of the multimedia content corresponding to the resource address.

The third determining module 443 is configured to: if the second feature information acquired by the second feature information acquiring module 442 is inconsistent with the corresponding original feature information, determine that the multimedia content is changed; and if the second feature information acquired by the second feature information acquiring module 442 is consistent with the corresponding original feature information, determine that the multimedia content is not stable.

In the embodiments of the present invention, the second feature information of the multimedia content may be a play duration, a file size, and a checksum of the multimedia content after the multimedia content is played.

As an embodiment of the present invention, the apparatus 40 for detecting a multimedia content change further comprises a comprehensive score adjusting unit 45, configured to lower a comprehensive score of instable multimedia content.

As an embodiment of the present invention, the apparatus 40 for detecting a multimedia content change further comprises a non-recommendation list adding unit 46, configured to add instable multimedia content into a non-recommendation list.

It should be noted that, during detecting whether the multimedia content is changed by the apparatus for detecting a multimedia content change according to the above embodiment, the apparatus is described by only using division of the above functional units or modules as an example. In practice, the functions may be assigned to different functional units or modules for implementation as required. To be specific, the internal structure of the resource propagation system is divided into different functional units or modules to implement all or part of the above-described functions. In addition, the apparatus for detecting a multimedia content change according to the above embodiment is based on the same inventive concept as the method for detecting a multimedia content change according to the embodiment of the present invention, where the specific implementation is elaborated in the method embodiments, which is not be detailed herein any further.

Figure 5:
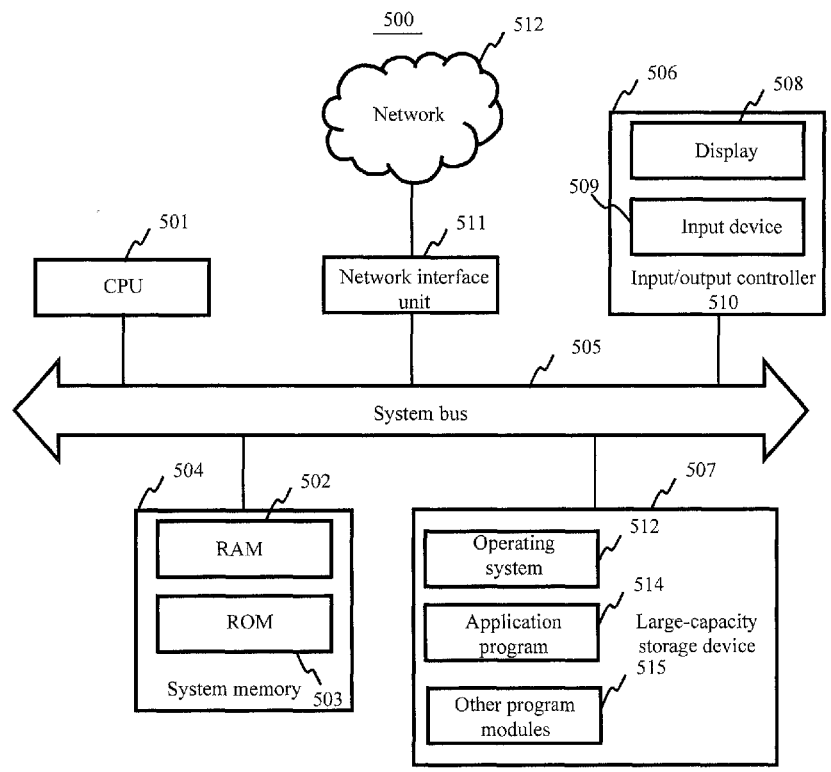
FIG. 5 is a schematic structural view of a server according to an embodiment of the present invention.

FIG. 5 illustrates a schematic structural view of a server according to an embodiment of the present invention. The resource propagation server 200 and the multimedia content server 300 may both employ such a structure as illustrated in FIG. 5, and may be configured to implement the method for detecting a multimedia content change according to an embodiment of the present invention.

A server 500 comprises a central processing unit (CPU) 501, a system memory 504 comprising a random access memory (RAM) 502 and a read-only memory (ROM) 503, and a system bus 505 communicatively connecting the system memory 504 and the CPU 501.

The server 500 further comprises a basic input/output system (BIOS) 506 for facilitating information transmission between various components within a computer, and a large-capacity storage device 507 for storing an operating system 513, an application 514, and one or more other program modules 515.

The BIOS 506 comprises a display 508 for displaying information, and an input device 509 such as a mouse and a keyboard, for information input by a user. The display 508 and the input device 509 are both communicatively connected to the CPU 501 via an input/output (I/O) controller 510 communicatively connected to the system bus 505. The BIOS 506 may further comprise the I/O controller 510 to receive and process inputs from such devices as a keyboard, a mouse, or an electronic stylus touch pen. Analogously, the I/O controller 510 further provides outputs to a display screen, a printer, or another type of output device.

The large-capacity storage device 507 is communicatively connected to the CPU 501 via a large-capacity storage controller (not illustrated in FIG. 5) communicatively connected to the system bus 505. The large-capacity storage device 507 and the non-transitory computer-readable storage medium associated therewith provide non-volatile storage for the server 500. To be specific, the large-capacity storage device 507 may include a non-transitory compute-readable storage medium (not illustrated in FIG. 5), for example, a hard disk or a CD-ROM driver.

Without loss of generality, the non-transitory computer-readable storage medium may comprise a computer storage medium and a communication media. The computer storage medium comprises volatile and non-volatile, movable and unmovable media that are implemented using any method and technology for storing information such as computer-readable instructions, data structures, program modules, or other data. The non-transitory computer-readable medium includes a RAM, a ROM, an EPROM, an EEPROM, a flash memory, or another such solid storage technology-based storage device; a CD-ROM, a DVD, or another such optical storage device; and a data cartridge, a magnetic card, a magnetic tape, or another such magnetic storage device. Nevertheless, a person skilled in the art may know that the non-transitory computer-readable storage medium is not limited to what are listed above. The system memory 504 and the large-capacity storage device 507 may be uniformly referred to as a memory.

According to the embodiments of the present disclosure, the server 500 may be further communicatively connected to a remote computer on the network by using a network such as the Internet, and may run on the computer. To be specific, the server 500 may be communicatively connected to a network 512 via a network interface unit 511 communicatively connected to the system bus 505, or the server 500 may be communicatively connected to another type of network or a remote computer system (not illustrated in FIG. 5) via the network interface unit 511.

At least one program is stored in the system memory 504 and is configured to be performed by at least one processor. The at least one program comprises instructions for performing the following operations:

acquiring original feature information of multimedia content when importing a resource address of the multimedia content;

receiving first feature information of the multimedia content from a client;

determining, according to the first feature information and corresponding original feature information of the multimedia content, whether the resource address of the multimedia content is abnormal; and detecting whether multimedia content at an abnormal resource address is changed.

Assuming that described above is the first possible implementation, with reference to the first possible implementation, in a second possible implementation, the at least one program comprises instructions for performing the following operations:

when importing the resource address of the multimedia content, download the multimedia content via the resource address of the multimedia content; and extracting the original feature information of the multimedia content.

When the multimedia content is an audio or a video, the original feature information comprises a play duration, a file size, and a file checksum of the multimedia content.

When the multimedia content is an image, the original feature information comprises a file size and a file checksum of the multimedia content.

With reference to the first possible implementation, in a third possible implementation, the at least one program comprises instructions for performing the following operations:

within a predetermined time period, counting the number n of play times where first feature information of the multimedia content sent by different clients is different from corresponding original feature information of the multimedia content in terms of play duration and/or file size, and the total number N of play times; and when n/N exceeds a predetermined threshold p, determining that the resource address of the multimedia content is abnormal;

where n and N are positive integers, and 0<p<1.

With reference to the first possible implementation, in a fourth possible implementation, the at least one program comprises instructions for performing the following operations:

comparing whether first feature information of multimedia content sent by different clients is the same, and if the first feature information is the same and is different from corresponding original feature information of the multimedia content in terms of play duration and/or file size, determining that the multimedia content is changed;

if the first feature information sent by some of the clients is different, acquiring second feature information of the multimedia content corresponding to the resource address;

if the acquired second feature information is inconsistent with the corresponding original feature information, determining that the multimedia content is changed; and if the acquired second feature information is inconsistent with the corresponding original feature information, determining that the multimedia content is changed.

With reference to the fourth possible implementation, in a fifth possible implementation, the at least one program comprises an instruction for performing the following operation:

lowering a comprehensive score of the multimedia content; or adding the multimedia content into a non-recommendation list.

The server 500 according to the embodiments of the present invention may be the resource propagation server 200 or the multimedia content server 300, or may be a server where the resource propagation server 200 and the multimedia content server 300 are integrated.

According to the embodiments of the present invention, the resource propagation server downloads multimedia content corresponding to a resource address sent by the multimedia content server, extracts original feature information of the multimedia content and receives first feature information of the multimedia content from the client, and determines whether the multimedia content is changed by comparing the original feature information of the multimedia content with the corresponding first feature information. In this way, the problem in the related art, that it needs to be determined, by repeatedly traversing a resource address of the multimedia content, whether multimedia content directed by the resource address is changed, and that the efficiency of detecting a multimedia content change is low and the cost thereof is high because a large number of normal resource addresses need to be repeatedly detected. Compared with the method for detecting a multimedia content change in the related art, the embodiments of the present invention firstly determine whether a resource address corresponding to multimedia content is abnormal, and if the resource address is abnormal, then determine whether the multimedia content corresponding to the resource address is changed, thereby preventing repeated checking of a large number of normal resource addresses, improving the detection efficiency, and reducing the detection cost.

The sequence numbers of the embodiments of the present invention are only for ease of description, but do not denote the preference of the embodiments.

Persons of ordinary skill in the art should understand that all or part of steps of the preceding methods may be implemented by hardware or hardware following instructions of programs. The programs may be stored in a non-transitory computer-readable storage medium, and may be executed by at least one processor. The storage medium may be a read only memory, a flash memory, a magnetic disk, or a compact disc-read only memory.

Described above are merely preferred embodiments of the present invention, but are not intended to limit the present invention. Any modification, equivalent replacement, or improvement made without departing from the spirit and principle of the present invention should fall within the protection scope of the present invention.

What is claimed is:

1. A method for detecting a multimedia content change, comprising:
    when importing a resource address of multimedia content, acquiring original feature information of the multimedia content;
    receiving first feature information of the multimedia content from a client;
    determining, according to the first feature information and corresponding original feature information of the multimedia content, whether the resource address of the multimedia content is abnormal; and
    detecting whether multimedia content corresponding to an abnormal resource address is changed;
    wherein the determining, according to the first feature information and the original feature information of the multimedia content, whether the resource address of the multimedia content is abnormal comprises:
    within a predetermined time period, counting the number n of play times where said first feature information of the multimedia content sent by different clients is inconsistent with original feature information of the multimedia content in terms of at least one of a play duration and a file size of the multimedia content, and the total number N of play times; and
    when n/N exceeds a predetermined threshold p, determining that the resource address of the multimedia content is abnormal, where n and N are positive integers, and $0<p<1$.

2. The method according to claim 1, wherein acquiring original feature information of the multimedia content comprises:
    when importing the resource address of the multimedia content, downloading the multimedia content via the resource address of the multimedia content; and
    extracting the original feature information of the multimedia content.

3. The method according to claim 1, wherein when the multimedia content is an audio or a video, the original feature information comprises a play duration, a file size, and a file checksum of the multimedia content.

4. The method according to claim 1, wherein when the multimedia content is an image, the original feature information comprises a file size and a file checksum of the multimedia content.

5. The method according to claim 1, wherein the first feature information is at least one of the play duration and the file size of the multimedia content when the multimedia content is played on different clients.

6. The method according to claim 1, wherein the detecting whether multimedia content corresponding to an abnormal resource address is changed comprises:
    comparing whether first feature information of multimedia content sent by different clients is the same, and if the first feature information sent by different clients is the same and is different from corresponding original feature information of the multimedia content in terms of at least one of the play duration and the file size of the multimedia content, determining that the multimedia content is changed;
    if the first feature information sent by different clients is different, acquiring second feature information of the multimedia content corresponding to the resource address; and
    if the acquired second feature information is inconsistent with the corresponding original feature information, determining that the multimedia content is changed.

7. The method according to claim 6, wherein if the acquired second feature information is consistent with the corresponding original feature information, it is determined that the multimedia content is unstable.

8. The method according to claim 7, further comprising: lowering a comprehensive score of the multimedia content.

9. The method according to claim 7, further comprising: adding the multimedia content into a non-recommendation list.

10. The method according to claim 6, wherein the multimedia content comprises video files and the step of acquiring second feature information of the multimedia content corresponding to the resource address specifically comprises:
    downloading video files corresponding to the abnormal resource addresses again, extracting the second feature information of the video files, wherein the second feature information of the video files includes a play duration, a file size, and a checksum of the video files after the video files are played.

11. An apparatus for detecting a multimedia content change, comprising a system memory and a central processing unit, the central processing unit being configured to execute software modules stored in the system memory, wherein:
    an original feature information acquiring module executed by the processing unit functions, when importing a resource address of the multimedia content, acquire original feature information of the multimedia content;
    a first feature information acquiring module executed by the processing unit functions to receive first feature information of the multimedia content from a client;
    an abnormal resource address detecting module executed by the processing unit functions to determine, according to the first feature information and the original feature information of the multimedia content, whether the resource address of the multimedia content is abnormal; and
    a multimedia content change detecting module executed by the processing unit functions to detect whether multimedia content corresponding to an abnormal resource address is changed;
    wherein the abnormal resource address detecting module comprises:
    a counting module executed by the processing unit to: within a predetermined time period, count the number n of play times where first feature information of the multimedia content sent by different clients is inconsistent with corresponding original feature information of the multimedia content in terms of at least one of a play duration and a file size of the multimedia content, and the total number N of play times; and
    a first determining module executed by the processing unit to: when n/N exceeds a predetermined threshold p, determine that the resource address of the multimedia content is abnormal, where n and N are positive integers, and 0<p<1.

12. The apparatus according to claim 11, wherein the original feature information acquiring unit comprises:
   a multimedia content downloading module executed by the processing unit to, when importing the resource address of the multimedia content, download the multimedia content via the resource address of the multimedia content; and
   an original feature information extracting module executed by the processing unit, to extract the original feature information of the multimedia content.

13. The apparatus according to claim 11, wherein when the multimedia content is an audio or a video, the original feature information comprises a play duration, a file size, and a file checksum of the multimedia content.

14. The apparatus according to claim 11, wherein when the multimedia content is an image, the original feature information comprises a file size and a file checksum of the multimedia content.

15. The apparatus according to claim 11, wherein the first feature information is at least one of the play duration and the file size of the multimedia content when the multimedia content is played on different clients.

16. The apparatus according to claim 11, wherein the multimedia content change detecting module comprises:
   a second determining module executed by the processing unit to compare whether first feature information of multimedia content sent by different clients is the same, and if the first feature information sent by different clients is the same and is different from corresponding original feature information of the multimedia content in terms of at least one of the play duration and the file size, determine that the multimedia content is changed;
   a second feature information acquiring module executed by the processing unit to, if the first feature information sent by different clients is different, acquire second feature information of the multimedia content corresponding to the resource address; and
   a third determining module executed by the processing unit to, if the acquired second feature information is inconsistent with the corresponding original feature information, determine that the multimedia content is changed.

17. The apparatus according to claim 16, wherein the third determining module executed by the processing unit further functions to, if the acquired second feature information is consistent with the corresponding original feature information, determine that the multimedia content is unstable.

18. The apparatus according to claim 17, wherein:
   a comprehensive score adjusting module executed by the processing unit functions to, when the multimedia content is unstable, lower a comprehensive score of the multimedia content.

19. The apparatus according to claim 17, wherein:
   a non-recommendation list adding module executed by the processing unit functions to, when the multimedia content is unstable, add the multimedia content into a non-recommendation list.

20. The apparatus according to claim 16, wherein the multimedia content comprises video files and the second feature information acquiring module is specifically configured to, download video files corresponding to the abnormal addresses again, and extract the second feature information of the video files, wherein the second feature information of the video files includes a play duration, a file size, and a checksum of the video files after the video files are played.

21. A resource propagation system, comprising an apparatus for detecting a multimedia content change; wherein:
   the apparatus for detecting a multimedia content change comprises a system memory and a central processing unit being configured to execute software modules stored in the system memory, wherein:
   an original feature information acquiring module executed by the processing unit functions to, when importing a resource address of multimedia content, acquire original feature information of the multimedia content;
   a first feature information acquiring module executed by the processing unit functions to receive first feature information of the multimedia content from a client;
   an abnormal resource address detecting module executed by the processing unit functions to determine, according to the first feature information and the original feature information of the multimedia content, whether the resource address of the multimedia content is abnormal; and
   a multimedia content change detecting module executed by the processing unit functions to detect whether multimedia content corresponding to an abnormal resource address is changed;
   wherein the abnormal resource address detecting module comprises:
   a counting module executed by the processing unit to: within a predetermined time period, count the number n of play times where first feature information of the multimedia content sent by different clients is inconsistent with corresponding original feature information of the multimedia content in terms of at least one of a play duration and a file size, and the total number N of play times; and
   a first determining module executed by the processing unit to: when n/N exceeds a predetermined threshold p, determine that the resource address of the multimedia content is abnormal, where n and N are positive integers, and 0<p<1.

22. The system according to claim 21, where the original feature information acquiring module comprises:
   a multimedia content downloading module executed by the processing unit to, when importing the resource address of the multimedia content, download the multimedia content via the resource address of the multimedia content; and
   an original feature information extracting module executed by the processing unit to extract the original feature information of the multimedia content.

23. The system according to claim 21, wherein when the multimedia content is an audio or a video, the original feature information comprises a play duration, a file size, and a file checksum of the multimedia content.

24. The system according to claim 21, wherein when the multimedia content is an image, the original feature information comprises a file size and a file checksum of the multimedia content.

25. The system according to claim 21, wherein the first feature information is at least one of the play duration and the file size of the multimedia content when the multimedia content is played on different clients.

26. The system according to claim 21, where the multimedia content change detecting module comprises:
   a second determining executed by the processing unit to compare whether first feature information of multimedia content sent by different clients is the same, and if the first feature information is the same and is different from corresponding original feature information of the multimedia content in terms of at least one of the play duration and the file size, determine that the multimedia content is changed;

a second feature information acquiring module executed by the processing unit to, if the first feature information sent by different clients is different, acquire second feature information of the multimedia content corresponding to the resource address; and a third determining module executed by the processing unit to, if the acquired second feature information is inconsistent with the corresponding original feature information, determine that the multimedia content is changed.

27. The system according to claim 26, wherein the third determining module executed by the processing unit further functions to, if the acquired second feature information is consistent with the corresponding original feature information, determine that the multimedia content is unstable.

28. The system according to claim 27, wherein:

a comprehensive score adjusting module executed by the processing unit functions to, when the multimedia content is unstable, lower a comprehensive score of the multimedia content.

29. The system according to claim 27, wherein:

a non-recommendation list adding module executed by the processing unit functions to, when the multimedia content is unstable, add the multimedia content into a non-recommendation list.

30. The system according to claim 26, wherein the multimedia content comprises video files and the second feature information acquiring module is specifically configured to, download video files corresponding to the abnormal addresses again, and extract the second feature information of the video files, wherein the second feature information of the video files includes a play duration, a file size, and a checksum of the video files after the video files are played.

* * * * *